No. 707,569. Patented Aug. 26, 1902.
W. T. EMMES.
QUICK FEED ARRANGEMENT FOR GEARS.
(Application filed Nov. 15, 1901.)
(No Model.) 3 Sheets—Sheet 1.
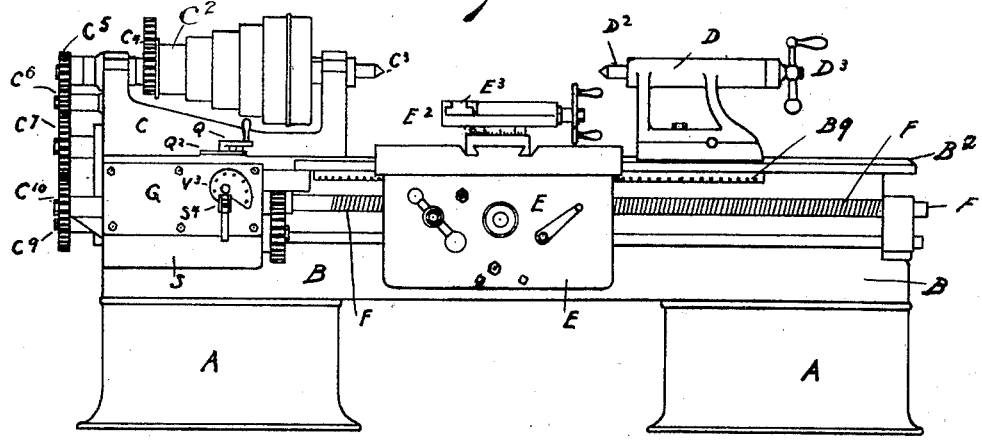
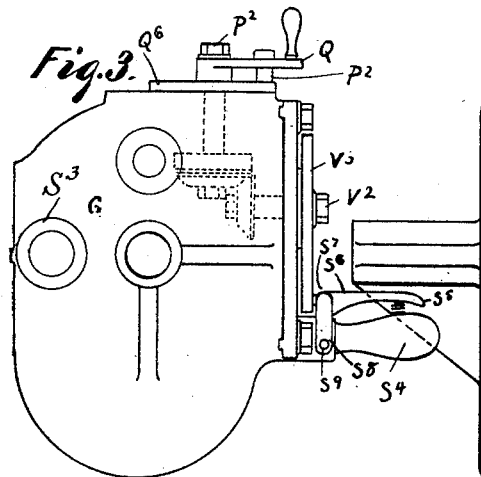
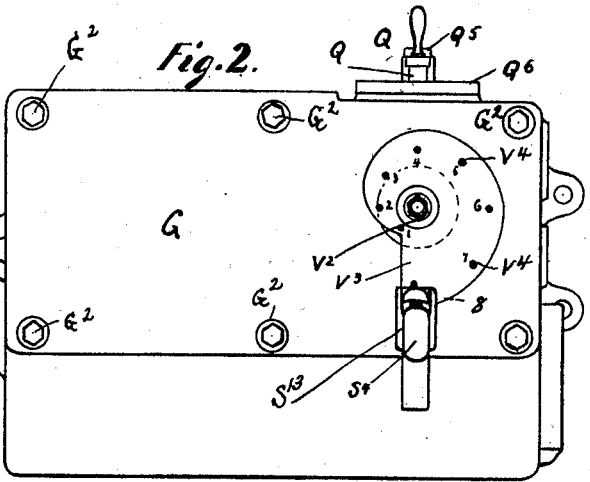
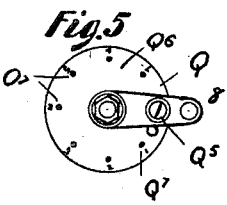
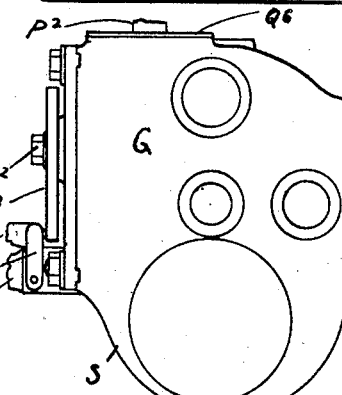
WITNESSES:
Samuel A. West
N. Smith
INVENTOR.
William T. Emmes
BY Wm. Hubbell Fisher,
ATTORNEY.

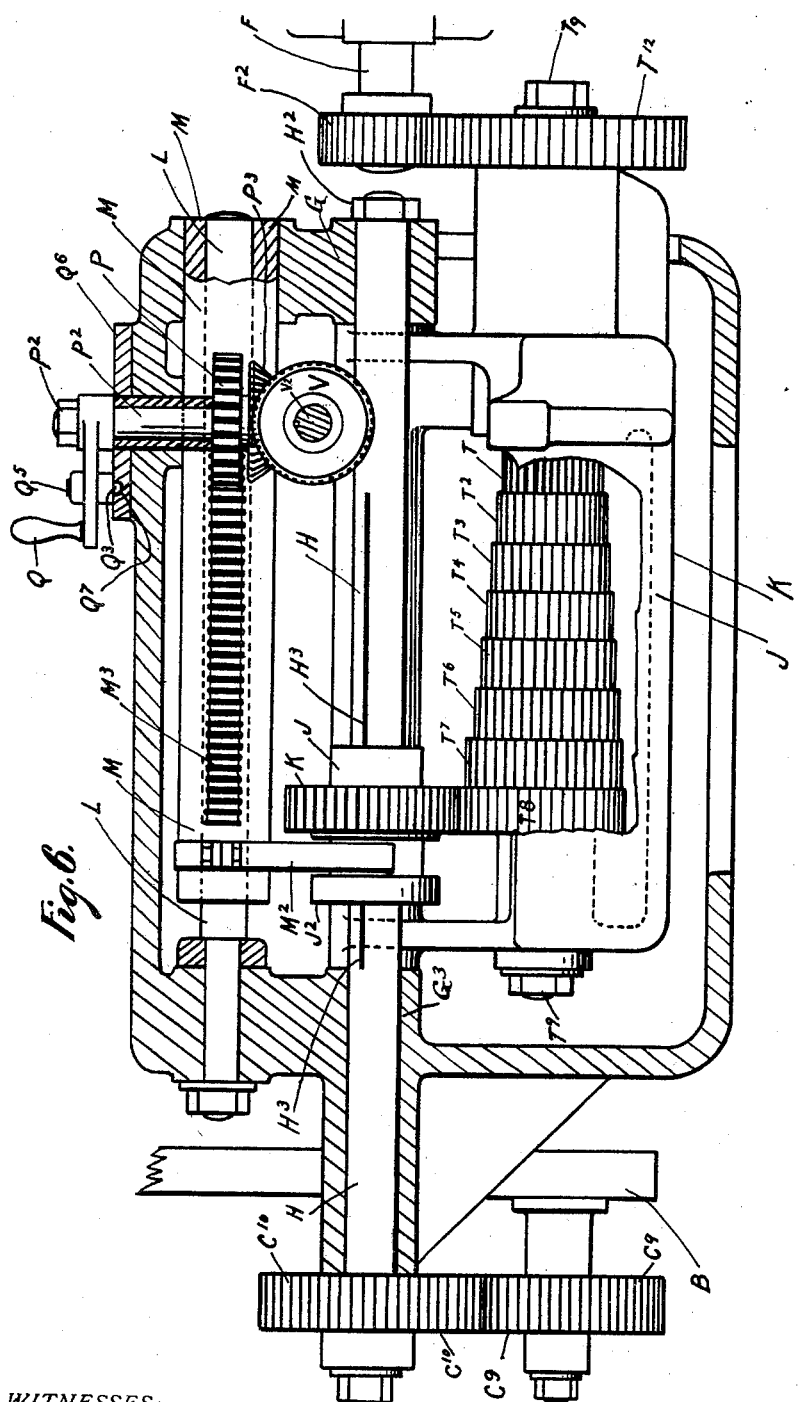

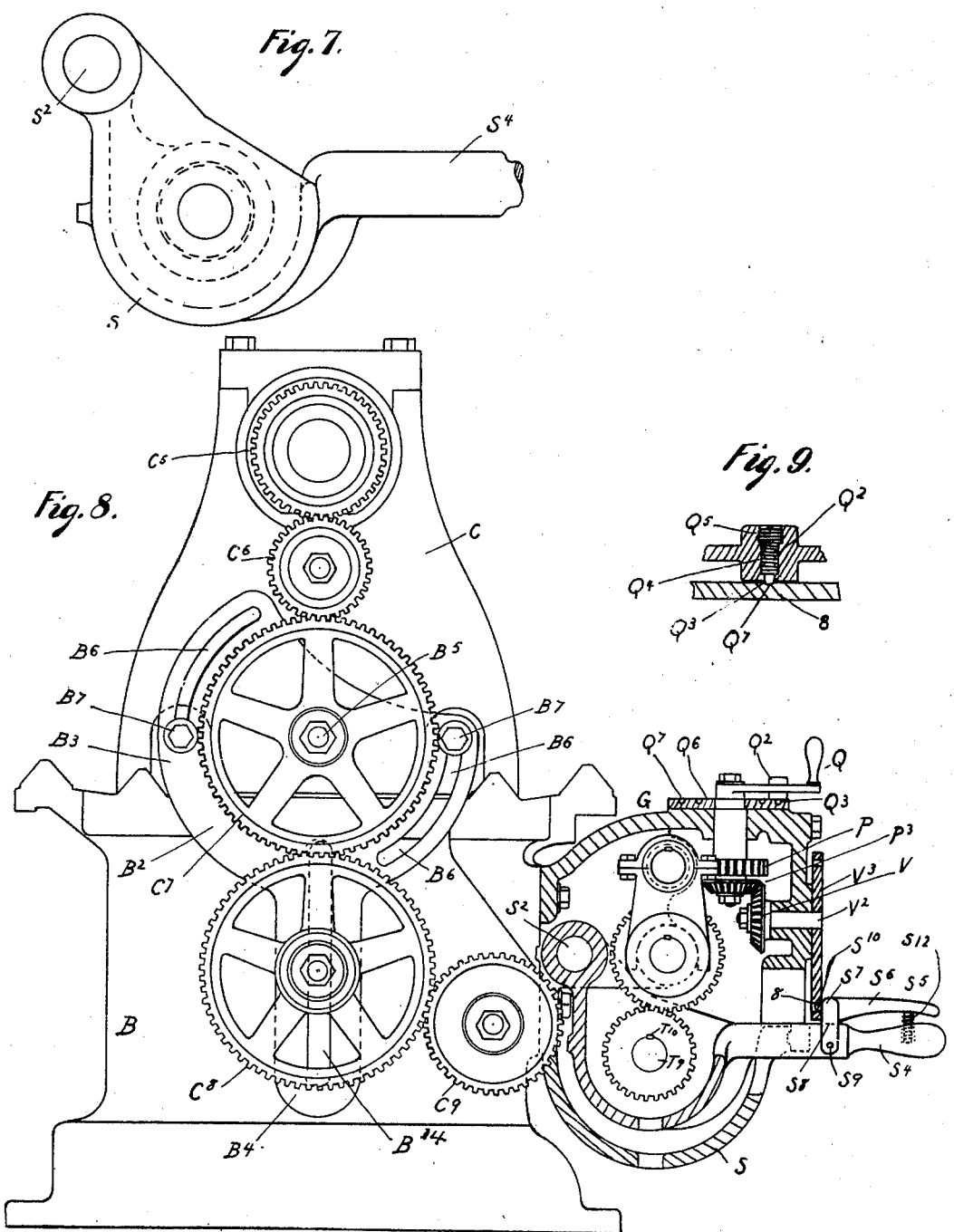

UNITED STATES PATENT OFFICE.

WILLIAM T. EMMES, OF CINCINNATI, OHIO.

QUICK-FEED ARRANGEMENT FOR GEARS.

SPECIFICATION forming part of Letters Patent No. 707,569, dated August 26, 1902.

Application filed November 15, 1901. Serial No. 82,347. (No model.)

*To all whom it may concern:*

Be it known that I, WILLIAM T. EMMES, a citizen of the United States, and a resident of the city of Cincinnati, in the county of Hamilton and State of Ohio, have invented certain new and useful Improvements in Quick-Feed Arrangements for Gears, of which the following is a specification.

The several features of my invention and the various advantages resulting from their use, conjointly or otherwise, will be apparent from the following description and claims.

In the accompanying drawings, making a part of this specification, and in which similar letters of reference indicate corresponding parts, Figure 1, Sheet 1, represents an elevation of the front side of a lathe and showing my invention combined therewith and made a part thereof. Fig. 2, Sheet 1, represents on a larger scale the front side of the portion of the lathe which illustrates my invention. Fig. 3, Sheet 1, is an elevation of that end of the structure shown in Fig. 2 which faces toward the left in the latter figure. Fig. 4, Sheet 1, is an elevation of that end of the structure shown in Fig. 2 which faces toward the right in said figure. Fig. 5, Sheet 1, is a plan view of the setting device in Figs. 2, 3, and 4 and which structure for the purposes of convenience in description I will denominate the "gear-box." Fig. 6, Sheet 2, is a view, partly in section and partly in elevation, of the gear-box and its immediate accompaniments. This view is on a larger scale than Figs. 2 to 5, inclusive. Fig. 7, Sheet 3, is an end elevation of the gear-cradle or swinging holder for certain gears, the handle thereof being partly broken off, as unnecessary to this view. Fig. 8, Sheet 3, is an elevation of that end of the lathe which is at the left hand in Fig. 1 and showing the gear-box, &c., as connected thereto; but the gear-box is partly in section to disclose certain portions of the interior construction. Fig. 9, Sheet 3, is a vertical longitudinal section of a part of the shank of the latch on the gear-box and of an adjacent part of the disk immediately below and showing the locking-pin, spring, and screw in elevation.

The classes of lathes to which my invention will be ordinarily applied are those known as "screw-cutting engine-lathes," "turret-lathes," "screw-machines" or any machine-tool requiring a variable feed. For the purposes of description I have shown a lathe whose parts, with the exception of those which constitute my invention, are well known. It will be understood that these well-known parts may be varied except so far as they require to be of a shape, configuration, and kind necessary to operate successfully in connection with my invention.

In the lathe which I have shown, A indicates the foundation, and B the lathe-bed. C indicates the head-stock, $C^2$ the mandrel, and $C^3$ the live center. $C^4$ indicates the back gear. $C^5$, $C^6$, $C^7$, $C^8$, and $C^9$, respectively, point out the train of gears. The tail-stock D has the dead-center $D^2$ and well-known means, including handle $D^3$, for advancing the dead-center $D^2$. E indicates the slide-rest or tool-carriage, having a tool-post adapted to carry a tool suitable for the work to be done. $B^9$ is a rack on the lathe-bed adapted to be engaged with a slide of the tool-rest E. F indicates the lead-screw for moving the tool-carriage regularly lengthwise. All of these parts are already in use and are to be varied as necessity may dictate.

I will now describe those parts and their construction and arrangement, all of which go to make up and constitute my invention.

G indicates what I have already termed a "gear-box" or structure duly united to the lathe, preferably by the bolts $G^2$. Within the gear-box is a rotatable shaft H, journaled in bearings $G^3$ $G^3$. On the rear end of this shaft is fixed a gear-wheel $C^{10}$. A head $H^2$ on the front end of this shaft and the gear-wheel $C^{10}$ on the other end of this shaft are the preferred means of preventing this shaft from slipping longitudinally. On the shaft H and concentric therewith is a bearing J, adapted to slide longitudinally along such shaft, but compelled to rotate therewith by suitable means, as the feather $H^3$, in the present illustrative instance, located on the shaft and engaging a recess in the bearing J. On this bearing and concentric therewith is fixed a gear-wheel K. Preferred means for moving this bearing J and gear-wheel K along the shaft H are as follows: On a shaft L, fixed in the gear-box, is a sleeve M, adapted to slide thereon. The shaft L is parallel to the shaft H. The sleeve M carries a finger or brace $M^2$, which engages the bearing J, and is prevented from leaving the bearing by means of the flange $J^2$. Yet the bearing J is free to turn, notwithstanding the finger $M^2$ is present. Upon the sleeve M is a rack $M^3$, which is engaged by a gear-wheel P, mounted on shaft $P^2$. The latter extends up through a journal-bearing of the gear-box and at its upper end receives and carries a lever Q with handle. Below the lever Q is a fixed graduated dial or disk $Q^6$, adapted to engage this lever at points of this graduation, preferably as follows: In the disks are holes $Q^7$ at proper intervals, and these bear characters or numbers to the extent of the desired changes in gears, as hereinafter more particularly pointed out. Thus in Fig. 5 there are eight of such openings $Q^7$, respectively numbered from "1" to "8." In a socket or sleeve $Q^2$ of this lever is a pin $Q^3$, whose shank extends through the lower and diminished part of the sleeve-opening $Q^2$. This pin cannot leave this socket because of its enlarged head. Behind the pin is a spring $Q^4$, compressed between said head, and a screw $Q^5$, screwed into the upper part of this socket. Thus the free end of this pin $Q^3$ continually presses against the graduated disk $Q^6$ and when opposite any one of the holes $Q^7$ will enter the same. The lower end of the pin $Q^3$ is beveled, and when the handle Q is forcibly moved the pin will rise out of the hole $Q^7$ it is in and enter the next hole $Q^7$. In this manner it can be moved until it sets into the desired hole.

In the gear-box are what may be termed "swinging gears," which are as follows: I provide a cradle or swinging support S for the desired number of such gears. This support is pivotally upheld at the rear part of the frame by a pivot $S^2$ and provided with journal-bearings $S^3$, wherein the bearings of a set of cone-gears T $T^2$ $T^3$ $T^4$ $T^5$ $T^6$ $T^7$ $T^8$ is present. The number of gears of this cone may be varied, and the size of the accompanying parts may be varied to correspond as desired. The gears are preferably arranged on a shaft $T^9$, carrying a feather $T^{10}$, interlocking with a groove in each gear. This shaft $T^9$ and these gears T to $T^8$, inclusive, are thus compelled to rotate together. These gears, therefore, belong to the oscillatory cradle S and are lowered or raised as the cradle S is raised. Suitable means are provided for raising and lowering the cradle and gears. Convenient means are illustrated—viz., the handle $S^4$, extending out from the front part of the cradle. I extend this handle out through the front casing of the gear-box, so that it can be operated in front of and outside of the gear-box. The opening $S^{13}$ in the gear-box and through which the handle extends is elongated, thus allowing the handle an uninterrupted movement in raising or lowering the gear-cradle S. The shaft $T^9$ carries the gear-wheel $T^{12}$, which when the cradle and gears T $T^2$, &c., are raised meshes with the gear-wheel $F^2$ of the lead-screw shaft F. These gear-wheels are changeable to admit of desired relative changes in their respective speed of rotation. The means for supporting the cradle and its gears relative to that particular gear-wheel of the series T $T^2$, &c., which is to be engaged by the gear-wheel K is as follows: On the shaft $P^2$ is fixed a bevel gear-wheel $P^3$, which meshes with bevel-gear V, fixed on shaft $V^2$. The latter is duly journaled in the gear-box G and extends through the latter and at its end outside of this box carries the graduated plate $V^3$. There are as many holes in this plate as there are gears T $T^2$ and the like on the shaft $T^9$ within the gear-box. Therefore there are in the present instance eight of such holes, and these holes will preferably be numbered or marked by a character such as will indicate the size or mesh, or both, of that gear-wheel of the series T to $T^8$ which this hole, in connection with the latch to be described, will hold up to and in engagement with the gear-wheel K. In the present illustrative instance I have respectively numbered said holes from "1" to "8," inclusive. Means for connecting the gear-cradle when raised to this plate are preferably as follows: The handle $S^4$ carries a latch $S^5$, which consists of a shank $S^6$, united to a yoke $S^7$, whose arms $S^8$ $S^8$ are at their lower ends duly pivoted at $S^9$ to the sides of the shank of the handle. The locking-pin $S^{10}$ of the latch is adapted to enter that hole in the plate $V^3$ which it brought opposite. A spring $S^{12}$ operates to elastically lift the shank $S^6$ of the latch, and so cause the locking-pin $S^{10}$ to enter such hole.

The shaft H through the intermediate gears preferably receives rotation from that train of gears which in Fig. 1 is shown at the left of the head-stock. This it does as follows: The gear $C^{10}$ on this shaft H meshes with gear $C^9$, duly supported, as on head-stock C. Gear $C^9$ meshes with gear $C^8$ and the latter, with $C^7$, in turn meshing with a suitable gear, in the present instance with gear $C^6$, engaging gear $C^5$ on mandrel $C^2$. Thus the gears T $T^2$, &c., and the lead-screw F and the tool-rest are caused to move in the desired relative coöperation with the mandrel. The gears of the gear-train, including the gears $C^{10}$ and $C^9$, may be interchanged at will. Ordinarily either or both of the gears $C^9$ and $C^8$ will be the ones interchanged. Such changes are readily accomplished by means of the gear-holder $B^2$, consisting of plate $B^3$, carrying arm $B^4$. This plate $B^3$ is centered on the shaft $B^5$ or an equivalent support, in either case concentric with the gear $C^7$, and carries the curved slots $B^6$ $B^6$, also concentric with the gear $C^7$. The arm $B^4$ has a slot $B^{14}$, in which the journal-bearing for the gear $C^8$ is located. This bearing can be set at any point along the length of this slot, so as to accommodate a gear-wheel of the desired diameter relatively to the gear on the journal-bearing of $C^9$. The curved slots $B^6$ $B^6$ enable the plate $B^3$ and its arm $B^4$ to be moved to a point where the gear-wheel $C^8$ of the desired size may be caused to properly engage the gear-wheel $C^9$ of the desired diameter. When the adjustments are duly made, bolts $B^7$ $B^7$, passing through these slots and into a fixed part of the lathe, are tightened, and the parts heretofore adjusted are fixed in position.

The mode in which my invention is operated and operates is as follows: Suppose it is desired to give the lead-screw F and the tool-rest the speed which the gear-wheel $T^8$ of the swinging gears will give when used in connection with the connecting-gears of the machine. The cradle of gears is first dropped by unlocking the latch $S^5$ and allowing it to descend. This operation carries the gears T $T^2$, &c., away from the gear-wheel K. The handle Q is moved so that the locking-pin $Q^3$ thereof comes over and drops into that one of the depressions $Q^7$ which is numbered "8." By this movement and set of the handle Q the gear-wheel P has been rotated and has so far moved the rack $M^3$ that the latter has moved the gear-wheel K directly above—i. e., in a plane with—gear $T^8$ and in condition to mesh with this gear $T^8$ when the latter is approximated with the gear K. While this is taking place, the gear-wheel $P^3$ on the shaft $P^2$ is rotated and in turn duly rotates gear-wheel V, and this in turn rotates the gear-wheel V, which latter communicates rotary motion to the shaft $V^2$, and the latter turns the graduated plate $V^3$, so that that one of the depressions, which in the present illustrative instance is marked "8," will be opposite the locking-pin $S^{10}$ when the cradle or swinging gear-box is raised, so that gear $T^8$ will mesh with gear K. It is to be noted that the depressions $V^4$ of the plate $V^3$ vary in distance from the center of the shaft to the extent which is necessary to lift that particular gear of the series T $T^2$, &c., which is opposite the gear K as adjusted by the handle Q, so that this particular gear shall mesh with the gear K. It is to be noted that the graduations on the disk $Q^6$ and the graduated plate $V^3$ and the meshing of a corresponding gear of the series T $T^2$, &c., with gear K are designed to be coincident and will be so. Thus when I have locked the handle Q on graduation "6" of discal plate $Q^6$ the gear K has been moved along until it is directly over the gear $T^6$ and the plate $V^3$ has been turned so that graduation "6" thereon is in readiness to engage the latch $S^5$ of handle $S^4$ when the swinging gear-box S is raised, gear $T^6$ thereby being caused to mesh with gear K. In Fig. 2 that depression in plate $V^3$ which bears the number "8" is covered by the latch, and the locking-pin $S^{10}$ is located therein, as shown in Fig. 8. In Fig. 5 that depression of the discal plate $Q^6$ which is numbered "8" is covered by the latch Q, whose locking-pin is in this depression. (See Fig. 9.) The numbering of the graduations on these plates may be in a direction the opposite of what is illustrated. It should be here noted that while each of the means on the upper disk or portion for engaging the lever for setting the gear-wheel K should have characters for enabling the operator to more easily recognize which of the cone-gears has been set to mesh with this gear-wheel K the other plate, as $V^3$, need not have such characters, because the setting of the gear-wheel K by the lever, as aforesaid, sets this second plate $V^3$, so that its means for locking the swinging holder in position are by this same lever set so that the means on this second disk for locking the swinging holder in place will be in the correct position for so locking it (the holder) at the correct height for the proper cone-gear thereon to engage the gear-wheel K. The swinging box S is duly lifted by the handle $S^4$, and the latch $S^5$ engages the plate $V^3$ at depression "8." Thus the gear $T^8$ will be lifted into mesh with the gear K and these two gears securely locked together. Rotation of the gear K by shaft H, as aforementioned, will operate to rotate the gear $T^8$ and its shaft $T^9$ at a given rate of speed. Through the intermediate agency of the gear $T^{12}$ on shaft $T^9$ and gear $F^2$ on lead-shaft F this latter shaft will be duly rotated. Thus the speed of lead-shaft F can be readily and quickly varied by causing the desired gear of the series T $T^2$ $T^3$, &c., to mesh with gear K. This mode of changing the gears and altering the speed of rotation of the lead-shaft has many advantages. Thus the mode of changing the gears is very efficient and rapid. It is, moreover, exceedingly convenient, and the means presented for changing and setting the gears are very simple. Consequently these can be operated easily by an ordinary workman without special thought. The construction of the mechanism is a very safe one. The interdependence of the handle Q and the graduated plate $V^3$ renders it impossible to move the handle Q without moving the plate $V^3$. Hence when the handle $S^4$ below is locked to the plate $V^3$ the handle above cannot be turned. Therefore it is necessary to first unlock the handle $S^4$ to latch $S^5$ and drop the gears T $T^2$ $T^3$, &c., away from gear K before handle Q can be turned and gear K moved laterally. Thus gear K can never be injured by being forced out of mesh or into mesh with any of the gears T $T^2$ $T^3$, &c., while the latter are raised. Neither can the speed of the lead-screw F be accidentally changed by inadvertently turning the handle Q, because, as hereinbefore mentioned, the handle Q cannot be moved while the gears T $T^2$ $T^3$, &c., are raised and the handle $S^4$ locked to the plate $V^3$. The mechanism is thus safely guarded against the accidental misplacement of its parts, and it will be sure to give the desired certain results.

In view of the foregoing description it will be evident that while certain mechanism as described is contained in a gear-box G, yet the presence of a box, technically considered, is not a necessity, as the means for supporting the parts now supported by the box may be a skeleton one and be suitably connected to the lathe. In relation to the handle Q and its locking-pin it may be remarked that the pin may be on the plate $Q^6$ and the depression $Q^7$ be provided in the handle mechanism; but as this is substantially a mere reversal of parts further specification thereof is unnecessary.

I have referred to the plate $V^3$ as having "graduations." By this term I wish to indicate that the holes or depressions $V^4$ are located a definite distance duly measured off relatively to the distance the swinging gear must be elevated to make a proper engagement between the desired gear of the swinging holder and the gear-wheel K. These holes are the preferred means for engagement between the plate and the latch of the swinging gear-holder, yet the means of connecting said holder may be varied and yet be included within certain features of my invention; but such means must occur at the proper relative distances heretofore mentioned.

What I claim as new and of my invention, and desire to secure by Letters Patent, is—

1. In a lathe, the combination of a driven part, a gear-wheel, means connected with the source of power for rotating said gear-wheel, and means for enabling this gear-wheel to slide along on a line coincident with the axis of its revolution, a graduated disk and handle adapted to engage the graduations of the disk, means for enabling the movement of the handle to move said gear-wheel laterally, and a second graduated disk, means for causing the handle aforesaid to move said graduated disk, a swinging holder or box, a series of gear-wheels within this holder and adapted when the box is elevated to engage by one of its gears the first-named gear-wheel, and means for enabling the swinging box to be latched according to the graduations of the second graduated plate, a shaft on which the series of gears are located, this shaft being adapted when these gears are raised to operate the driven part, substantially as and for the purposes specified.

2. In a lathe, the combination of a driven part, a gear-wheel, means connected with the source of power and adapted to rotate said gear-wheel, a shaft on which this gear-wheel is slidable and with which it is rotatable, a graduated disk $Q^6$ and handle adapted to engage the graduations of the disk, a second disk with graduations, means adapted to give simultaneously to the said gear-wheel and the said disk a rectilinear and a rotatory motion respectively, a swinging holder or box, a series of gears supported thereby and adapted when the box is raised, to have one of its gears engage the first-named gear-wheel, and means for enabling the swinging box when elevated to engage the second disk in accordance with the graduations thereof, and support the series of gears, the shaft of said gears, means for communicating the motion of this shaft to the driven part, substantially as and for the purposes specified.

3. In a lathe, a shaft adapted to be operated by the power whereby the lathe is operated, a gear-wheel adapted to slide upon such shaft and to be rotated thereby, a handle and a graduated disk, adapted to engage the handle relatively to its graduations, a shaft rotatable by said handle, a gear-wheel on said shaft, a sliding rack adapted to be operated by said gear-wheel, a finger or projection on the rack, a projection in connection with the first-named gear-wheel adapted to engage such projection of the rack, and thus enable the sliding gear-wheel to be slid along its shaft, a swinging box or holder, a series of gears supported therein, that one of such gears which is opposite the sliding gear-wheel meshing with the latter when the swinging box or holder is raised, a latch connected to the swinging holder, a second plate, means connecting the handle-shaft aforementioned and the second plate, so that the rotation of the handle shall operate to move such plate relatively to the handle and to the movement of the sliding gear-wheel, and a series of means on the second plate for enabling the swinging holder to be latched thereto relatively to the rotation of said handle, and to the movement of said slidable gear-wheel, and to the amount of movement necessary for the swinging box to cause the desired gear of the swinging holder to mesh with the slidable gear-wheel, a driven part of the lathe and means between the gear of the swinging holder and the driven part for enabling said gear to operate such driven part, substantially as and for the purposes specified.

4. In a lathe, a shaft adapted to be operated by the power whereby the lathe is operated, a gear-wheel adapted to slide on such shaft and to be rotated thereby, a handle and a graduated disk, adapted to engage the handle relatively to its graduations, a shaft rotatable by said handle, a gear-wheel on said shaft, a sliding rack adapted to be operated by said gear-wheel, a finger or projection on the rack, a projection in connection with the first-named gear-wheel, adapted to engage such projection on the rack, and thus enable the sliding gear-wheel to be slid along its shaft, a miter-gear on the handle-shaft, a swinging box or holder, a series of gears supported therein, and that one thereof, when the swinging holder is lifted, which is opposite the slidable gear-wheel becoming ready for engagement with the slidable gear-wheel, a latch connected to the swinging holder, a miter gear-wheel meshing with the first-named miter-gear, a shaft on which the latter gear is carried, a second plate rotatable by this latter shaft, and a series of means on the second plate for engagement of the latch relative to the setting of the first-named handle, and the corresponding gear-wheel in the swinging holder, which latter gear-wheel, in that instance, engages the slidable gear-wheel, a driven part and means for enabling that gear-wheel of the series of gears in the holder to operate such driven part, substantially as and for the purposes specified.

5. In a lathe, the combination of a shaft H, suitable fixed supports in which this shaft is journaled, and the gear-wheel K adapted to slide thereon, a rod L parallel to shaft H, a sliding rod or sleeve M, the rack $M^3$ carried thereby, and in connection with the rack the shaft $P^2$, duly journaled, and the lever or handle Q carried thereby, a pin $Q^3$ on this handle, a graduated disk $Q^6$ with whose graduations the pin is adapted to engage, a gear-wheel P on the shaft $P^2$ and engaging the teeth of the rack $M^3$, a miter-gear $P^3$ on the shaft $P^2$, a shaft $V^2$, at an angle to the shaft $P^2$ and a miter-gear V thereon engaging the miter-gear $P^3$ of shaft $P^2$, a graduated plate $V^3$ adapted to be rotated by the shaft $V^2$, the swinging holder pivoted at $S^2$, shaft $T^9$, journaled in the swinging holder, and the set of cone-gears T, $T^2$, $T^3$, &c., on said shaft, and the gear $T^{12}$ on the same shaft, the driven part, connections for enabling the gear $T^{12}$ to rotate the driven part, means for lifting the swinging holder S and a latch $S^5$, $S^{10}$, for engaging any one of those graduations of the plate $V^3$ which is in position, having been set by the handle Q at the desired point on the graduated disk $Q^6$, substantially as and for the purposes specified.

6. In a lathe, the combination of a train of interchangeable gears $C^8$, $C^7$, &c., a shaft H, a gear-wheel slidable thereon, a rack $M^3$ slidable parallel to shaft H, a shaft $P^2$, a handle or lever carried thereby, and a gear engaging said rack, a miter-gear, a shaft $V^2$, a miter-gear thereon and engaging the first-named miter-gear, and a graduated plate $V^3$, adapted to be rotated by shaft $V^2$, a swinging holder, a set of cone-gears carried thereby, the shaft $T^9$, means for lifting the holder and for enabling the holder to be duly connected to the proper graduation of such plate, a gear $C^{10}$ on the shaft H, in connection with the said train of interchangeable gears $C^8$, $C^7$, &c., a driven part, means for enabling the mechanism aforedescribed to operate the driven part, substantially as and for the purposes specified.

7. In a lathe, a part to be driven, a swinging holder, a set of cone-gears therein, a shaft for said gears, means for enabling the part to be driven to be rotated by the said shaft, and a graduated plate as $V^3$ having graduations, and means on the swinging holder when raised to engage the desired one of these graduations, a shaft for rotating this disk, a shaft, a gear-wheel slidable thereon, a sliding finger or connection for sliding the gear-wheel, a lever, a shaft carrying this lever, and means for enabling the latter shaft to simultaneously operate both the sliding gear-wheel and the shaft operating the first-named graduated plate, by which connection with the box-holder is made, and a series of graduations for setting the lever aforesaid so that by the means mentioned, the proper gear in the swinging holder shall engage the slidable gear-wheel, substantially as and for the purposes specified.

WILLIAM T. EMMES.

Attest:
JOHN E. FITZPATRICK,
K. SMITH.